United States Patent
Nguyen

(10) Patent No.: US 11,240,149 B2
(45) Date of Patent: Feb. 1, 2022

(54) RANK AND ROUTING TECHNIQUES FOR NETWORKED DEVICE

(71) Applicant: Itron Global SARL, Liberty Lake, WA (US)

(72) Inventor: Viet-Hung Nguyen, Saint-Mande (FR)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 16/861,105

(22) Filed: Apr. 28, 2020

(65) Prior Publication Data

US 2021/0336879 A1    Oct. 28, 2021

(51) Int. Cl.
*H04L 12/753* (2013.01)
*H04L 12/751* (2013.01)
*H04L 12/26* (2006.01)
*H04L 12/721* (2013.01)
*H04L 12/707* (2013.01)

(52) U.S. Cl.
CPC .............. *H04L 45/48* (2013.01); *H04L 43/16* (2013.01); *H04L 45/02* (2013.01); *H04L 45/123* (2013.01); *H04L 45/124* (2013.01); *H04L 45/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0286426 A1* | 12/2005 | Padhye | .................. | H04W 40/02 370/238 |
| 2008/0279101 A1* | 11/2008 | Wu | ....................... | H04L 45/123 370/235 |
| 2012/0188934 A1* | 7/2012 | Liu | .......................... | H04L 1/004 370/312 |
| 2013/0121178 A1* | 5/2013 | Mainaud | ............... | H04W 40/12 370/252 |
| 2013/0121337 A1* | 5/2013 | Nguyen | .................. | H04L 45/54 370/392 |

(Continued)

FOREIGN PATENT DOCUMENTS

WO    WO2014025366    2/2014

OTHER PUBLICATIONS

Pursley, et al. "Routing for Multimedia Traffic in Wireless Frequency-Hop Communication Networks" IEEE Journal on Selected Areas in Communications, vol. 17, No. 5, May 1999, 9 pages.

*Primary Examiner* — Xavier S Wong
(74) *Attorney, Agent, or Firm* — Lee & Hayes, P.C.

(57) ABSTRACT

Techniques configure a network to relay data from a node to a root device are described herein. In an example, one-hop neighbors of the node are determined and ranked according to link quality. The ranked neighbor nodes may be considered potential "parent nodes" of the node. The ranked nodes may be divided into a plurality of groups according to link quality. A parent node may be selected from among the "best" group of one-hop neighbor nodes and may be used to relay data for the node to and/or from the router or other device. The node continues to use the parent node at least until its ranking removes it from the best group or falls below a threshold value. After the ranking of the parent falls below such a prescribed threshold it may be replaced by selection of a replacement parent from the group of one-hop upstream neighbors having the best link quality.

20 Claims, 4 Drawing Sheets

(56) References Cited

U.S. PATENT DOCUMENTS

2014/0036702 A1* 2/2014 Van Wyk ............ H04L 43/0823
370/252
2014/0056210 A1* 2/2014 Jafarian ................ H04W 88/04
370/315

* cited by examiner

RANK AND ROUTING TECHNIQUES FOR NETWORKED DEVICE

BACKGROUND

Routing protocol for low-power and lossy networks (RPL networks) and RPL-like networks may use rank as a unique metric for both routing (e.g., upward/downward routing to/from a border router) and RPL direction-oriented directed acyclic graph (DODAG) tree construction. In such networks, some weaknesses are observed.

Networks with too many leaves form too few parent-child relationships and do not utilize the benefits of data relay. Such networks may require nodes to be equipped with high-powered transmitters, receivers, and/or transceivers.

In some networks, a rank of a node may be computed using link quality metrics, such as estimated transmission number (ETX) or estimated transmission time (ETT) of all links on an upstream or downstream path from a node to the border router. In such networks, a small change in link quality between one or more parent/child node-pairs may lead to one or more nodes changing rank. Changes in link quality may result from a variety of different conditions, such as radio interference, shared radio frequency (RF) spectrum, packet collisions, etc. In one example, when link quality degrades (or when costs of alternative pathways to a border router change) nodes may lose their parents and may need to "poison their children," i.e., decline to continue to act as a parent and decline to forward packets to or from nodes that were previously their children. Accordingly, all or part of the network may have to build an alternative set of parent-child relationships and associated upward and/or downward paths.

In another example, as link quality varies between better and worse quality levels, nodes may move between different sets of parents. This reorganization of the network injects additional control traffic (and associated battery power use) into the network. In such examples, the network may be unstable and may provide poor performance. Indications of such poor performance include unreachable nodes, low data throughput, and/or high latency.

Accordingly, systems and techniques that limit the impact of link quality variation on network stability and that do not compromise routing performance would be welcome.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes network node rank and data packet routing techniques for devices (i.e., "nodes") networked in a radio frequency (RF) mesh environment. The techniques provide network stability, connectivity and performance, even while the network experiences changes in link quality. The disclosure describes techniques for the separation of packet routing from techniques for network formation.

Example techniques describe how to configure a mesh network to relay data between an arbitrary node and a router device. The router device may be an upstream device, such as a root node, that has a network connection, e.g., an internet connection. In examples, one-hop neighbors of the node in the mesh network are determined and ranked according to link quality. The ranked one-hop neighbor nodes may be considered potential "parent nodes" of the node. The link quality metric may be a summation of one-hop link quality values from the node to a router or root node or device. The ranked nodes may be divided into a plurality groups according to link quality. In an example, groups of ranked nodes may be thought of as "high quality," "medium quality" and "low quality" prospective parent nodes. Three groups may be a workable number of groups in many network environments; however, a larger or smaller number of groups of nodes may be used. The number of groups may be determined by the number of one-hop neighbors or other network characteristic(s). To associate the node with a parent node having high link quality, the parent may be selected from among the "high quality" group of one-hop neighbor nodes. Once selected, the parent node may be used within a chain of nodes to relay data for the node to and/or from the router or other device. The node continues to use the parent node at least until its ranking removes it from the "high quality" group of one-hop neighbors. In a further example, the parent node may be used until it falls into a middle area of the "medium quality" group of parent nodes. In a still further example, the parent node may be used until it falls below a threshold value based at least in part on link quality and/or a summation of link quality values. The threshold value may be located in any of the three groups of parent nodes, but is typically located in the second-tier quality group. After the ranking of the parent falls below some prescribed threshold it may be replaced by selection of a replacement parent from the "high quality" group.

Example System and Techniques for Network Formation

Figure 1:
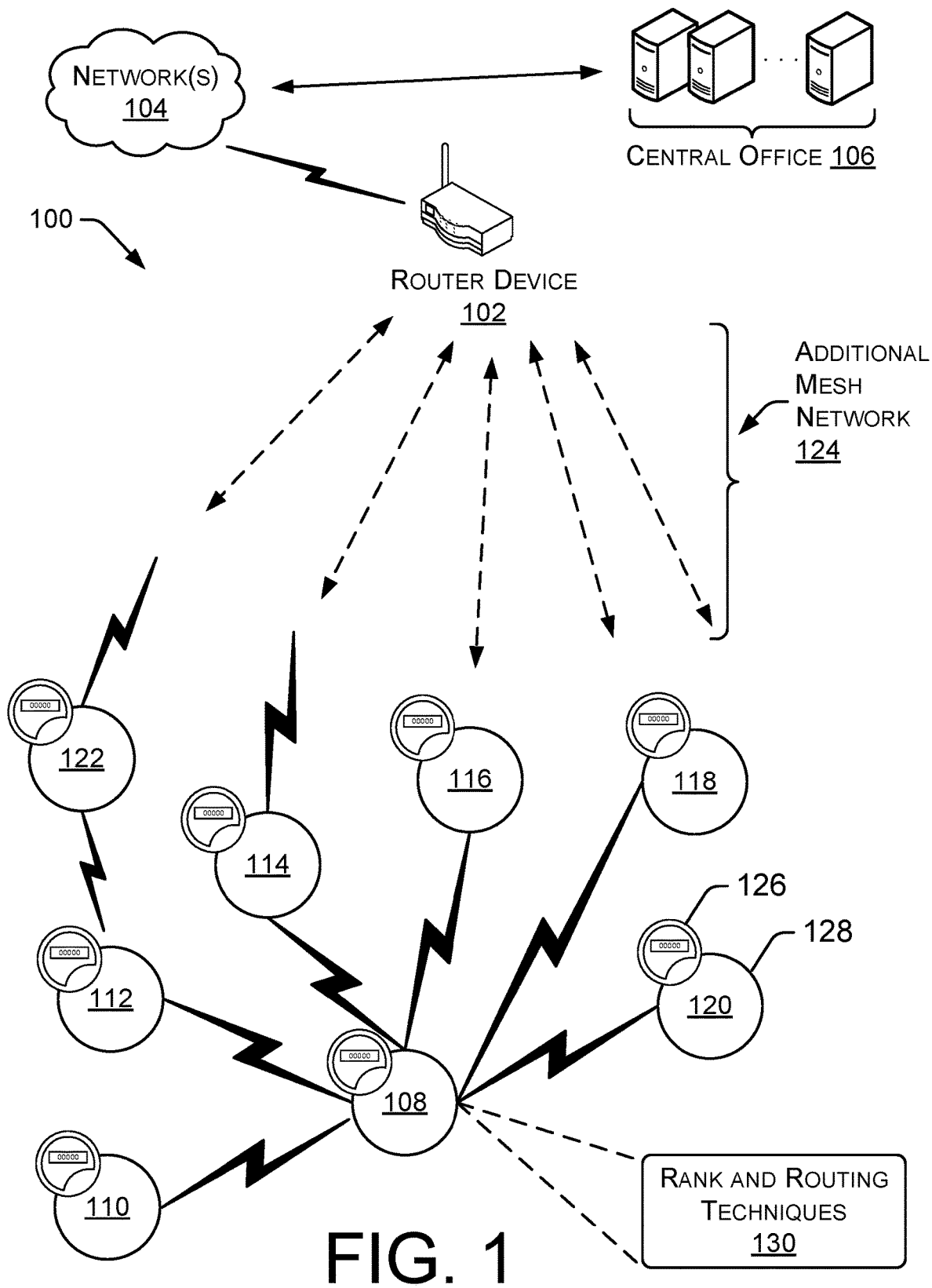
FIG. 1 is a diagram showing portions of an example network containing a node having a plurality of one-hop neighbors, each of which may potentially be used as a parent by the node to relay data to and from the node.

FIG. 1 shows portions of an example network 100 containing a node (e.g., node 108) having a plurality of one-hop neighbors (e.g., nodes 112-120), each of which may potentially be used as a parent by the node to relay data to and from the node. In the example, the network 100 may be a mesh network, including a plurality of devices that relay information upstream and downstream, such as between a router device and a plurality of network nodes using parent nodes to relay data for child nodes.

In the example, a root node (e.g., the router device 102) may be in radio frequency (RF) communication with one or a plurality of nodes in the mesh network. The router device 102 may have an internet connection (e.g., wired or RF, such as a cellular connection). The internet 104 (or a local network) may communicate with a central office 106, which may be any computing device, such as servers associated with a utility company, or servers having some role in managing, owning or using the mesh network 100 and the nodes and devices of, and/or associated with, that network. In some examples, the central office 106 may manage many networks, and may use a router device to communicate with devices in each network.

A network node 108 is part of the mesh network 100. In the example shown, the network node 108 is the parent node to a child node 110 that is downstream from the network node 108. Thus, parent nodes are upstream (closer to the router 102) and have lower rank. Child nodes are downstream of their respective parent nodes, and have higher rank. A "leaf node" is a node (e.g., node 110) that has no downstream neighbor nodes, and is of higher rank than its parent node 108.

Rank is a measure of a position of a node within a network. A node may be considered to be of lower rank based at least in part on its ability to communicate with a root node or a root device (e.g., router 102) using fewer relayed transmissions (e.g., a lower expected transmission count or ETX) or based at least in part on its ability to communicate with the root device more quickly (e.g., a lower estimated transmission time or ETT), or based at least in part on other metrics or measures.

In the example shown, a plurality of one-hop upstream neighbors to node 108 are shown, including nodes 112-120. Node 110 (a child of node 108) is a one-hop neighbor but is downstream of node 108. While one-hop neighbors 112-120 are shown, the number of one-hop upstream neighbors for any network node may be fewer or much larger, depending on network layout, geometry, RF conditions, etc. Accordingly, the example of FIG. 1 is for purposes of illustration and explanation and is not intended to convey any limitations to the systems and/or techniques described.

A node 122 is a two-hop neighbor, upstream of the node 108. Accordingly, the node 122 is not a suitable parent for the node 108. A region 124 of the mesh network 100 is representative of a potentially large number of nodes. The nodes may be configured to relay data upstream and downstream for the nodes 108-122 that are located downstream of the region 124. While not all nodes are shown individually, the mesh network 100 may have many hundreds or many thousands of nodes, and the drawings shown are accordingly simplified to better convey the illustrated concepts.

Figure 2:
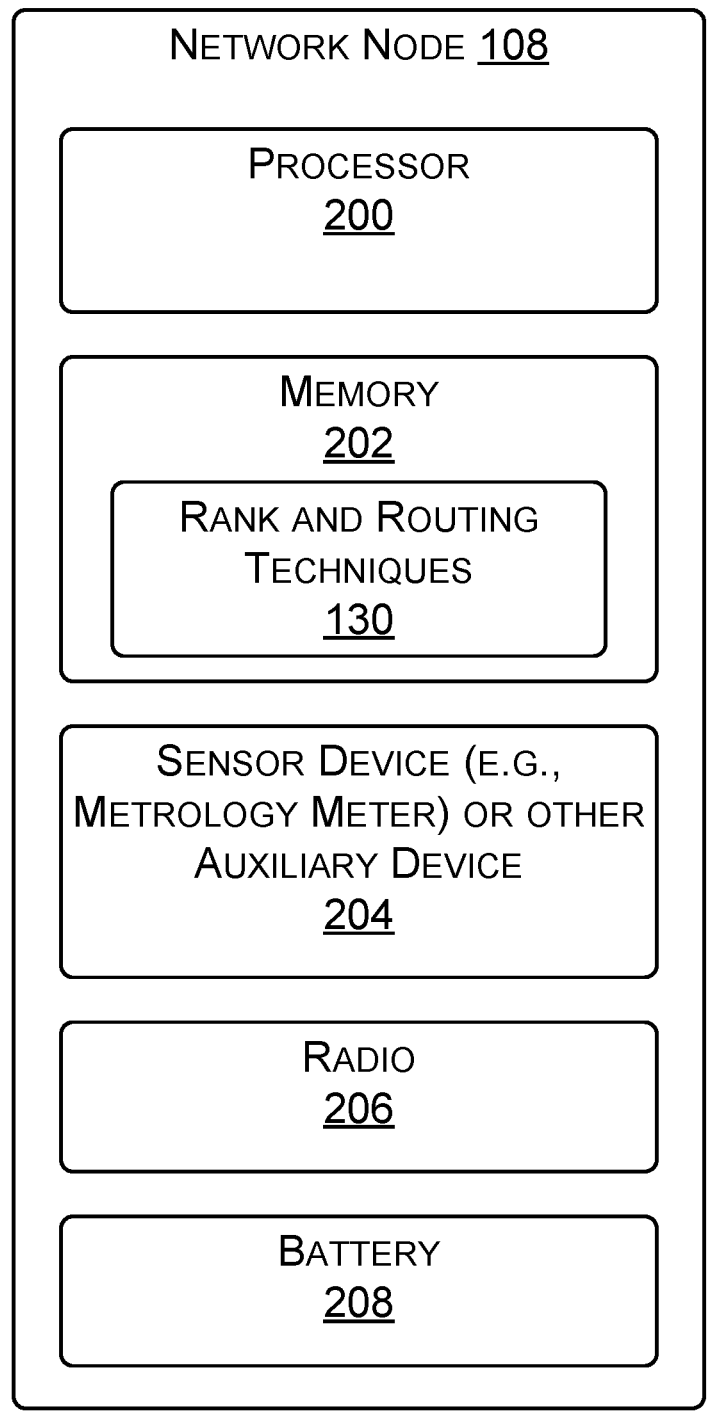
FIG. 2 is a block diagram showing an example structure and layout of a node configured to utilize rank and routing techniques for network devices including those described herein.

In some examples of the network 100, each node may contain various components. In the example of node 120, a metrology component 126 and a data processing component 128 are representative of such components. A further example of such components is shown in FIG. 2. The data processing components of some or all of the nodes in the network 100 may be configured to include rank and routing systems, devices and techniques 130, as described herein.

FIG. 2 shows an example structure and layout of the node 108 configured to utilize rank and routing techniques for network devices including those techniques described herein. In the example, a processor 200 is configured to store data and to execute statements and programming located in a memory device 202. In the example, programming may include statements configured to implement rank and routing techniques 130 discussed herein, including the flow diagrams of FIG. 4. In some examples, the network node 108 may include a sensor device or other auxiliary device 204. In other examples, the node may include any other device, such as sensors, specialized processors, network interfaces, user interfaces, or any other device(s). In the example of FIG. 1, the sensor device is more specifically shown as a metrology device 126, such as used in an electricity meter, gas meter, water meter, or other utility consumption-measurement device. Accordingly, the network node 108 and the network of FIG. 1 are usable in the utility industry. However, alternative examples of the network 100 are usable in any arbitrary internet of things application.

In the example of FIG. 2, a radio 206 is configured to communicate with upstream and/or downstream neighbors, particularly parent and/or child one-hop neighbors. In some instances, particularly if the router is a one-hop neighbor, the radio 206 may be configured to communicate with an internet-connected device, such as a network edge device (e.g., router 102 of FIG. 1). In some applications, the network node may be powered by a battery 208. For example, in water meter and gas meter applications, the node may be battery-powered. However, in an electricity meter application, the node may be mains-powered.

Figure 3:
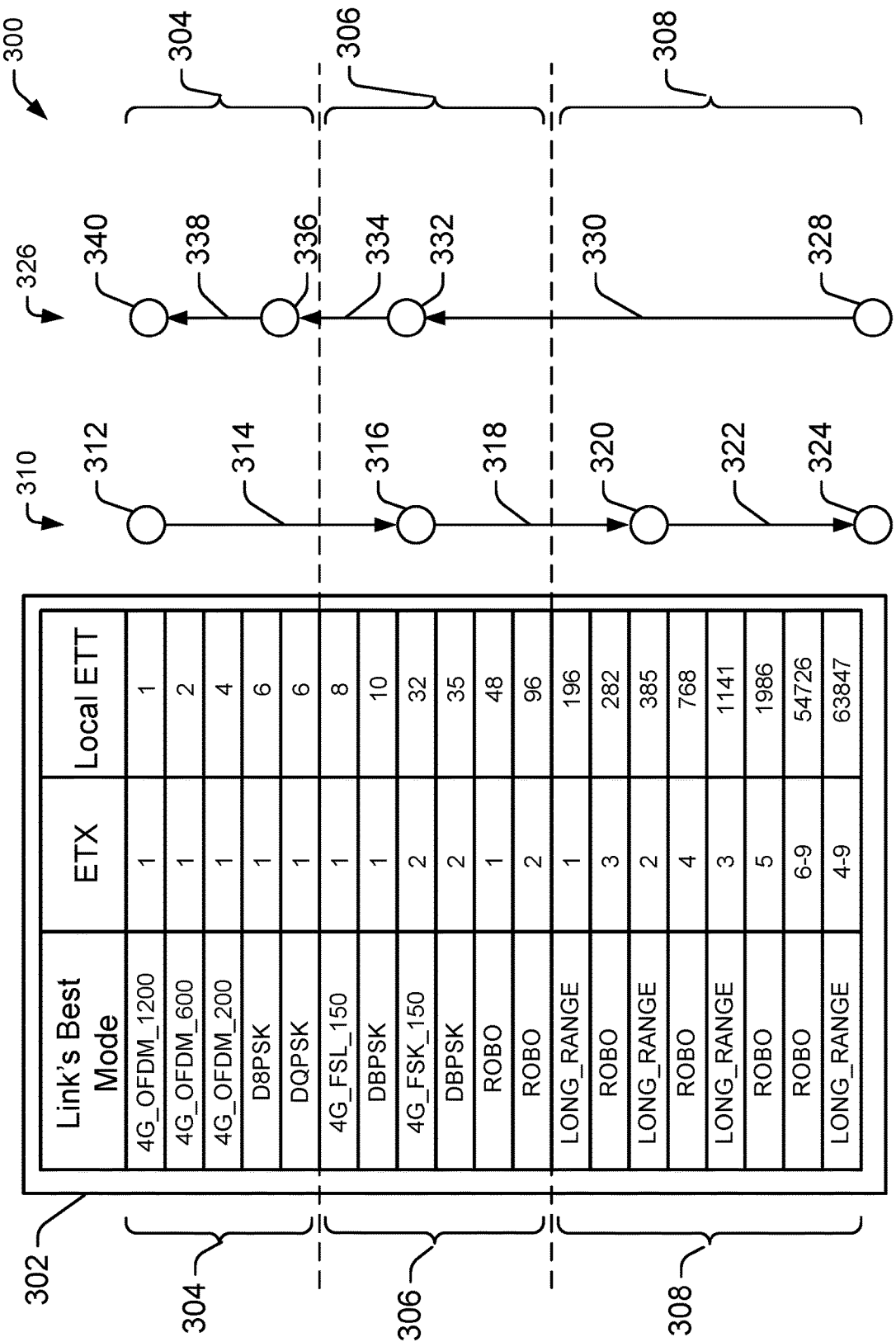
FIG. 3 is a block diagram showing an example parent list which may be utilized by a node or other network device configured for rank and routing techniques including those described herein.

FIG. 3 shows example routing techniques 300, including an example parent list 302 which may be utilized by a node (e.g., node 108 of FIG. 1) or other network device configured for rank and routing techniques including those described herein. The routing techniques 300, including an example parent list 302 may be all or part of the rank and routing techniques 130 of FIG. 1. The parent list 302 may be custom designed and/or rendered for each node in the mesh network 100, and include link quality data for each one-hop neighbor of the relevant node.

In the example shown, three buckets or groups 304, 306, 308 are used to segregate one-hop upstream neighbors of a node within a mesh network. Accordingly, each group 304, 306, 308 contains one or more one-hop neighbors of the network node (e.g., node 108 of FIG. 1) associated with the parent list 302. At the time of formation of the three groups, group 304 is the group of one-hop neighbors of the node associated with the parent list having the best link quality. Link quality may be associated with link traffic from a node in the group to and/or from the router or edge device of the mesh network. Group 306 has intermediate link quality, and group 308 has relatively poor link quality.

Within the parent list 302, each one-hop neighbor of the relevant node is associated with a horizontal line of text. As seen, five one-hop neighbors are in group 304, and would be preferred choices for use as a parent of the node. The first column of the chart shows a mode or a modulation scheme that produces the link quality that was considered when the node was associated with the group 302 of nodes. In the example shown, the first listed one-hop neighbor and potential parent of the node associated with the parent list 302 uses the 4G_OFDM_1200 modulation scheme.

The second column of data in the parent list 302 shows a first example measure or metric of link quality. In particular, expected transmission count (ETX) estimates a future or expected number of transmissions (through a path in the mesh network associated with the prospective parent node) of a packet necessary for it to be received without error at its destination. Accordingly, in some implementations, the ETX is not an actual count of past transmissions but is a packet error probability. Thus, a lower ETX value indicates that a node is more likely to be an efficient and preferred parent for the node at issue. The one-hop neighbor node(s) may be ranked, and organized into groups, at least in part by use of the ETX value of each node.

The third column of data in the parent list 302 shows a second example measure or metric of link quality. In particular, the estimated transmission time (ETT) is shown. The ETT value(s) may be computed from ETX value(s), such as by operation of complex known formulas. The ETT value may be highly penalized by a high ETX value. Accordingly, ETT values may vary largely and quickly. Thus, a lower ETT value indicates that a node is more likely to be an efficient and preferred parent for the node at issue. The one-hop neighbor node(s) may be ranked, and organized into groups, at least in part by use of the ETT value of each node.

In some examples, ETX, ETT and/or other metric(s) of link quality may be used to rank the one-hop neighbors and/or to group them in one or more groups or "buckets" 304, 306, 308.

An example path 310 shows reevaluation of a node in an example where link quality is degraded. Note that reevaluation of link quality of a node may result in creation or rendering of a new version of the parent list 302. A node may have excellent link quality and may be rated in a location or quality level 312 above other nodes in the higher link quality group 304. The quality level 312 indicates that the associated node would be a preferred candidate of a network node to be a parent of a network node having and/or using the parent list 302. However, the node may experience degraded RF conditions, packet collisions, radio interference, battery and/or voltage problems, changes in local terrain and/or RF-blocking construction, etc. Responsive to these problems, the link quality may decrease by an amount 314 to locate the node at a new quality level 316, in the medium link quality group 306. Responsive to further issues such as RF interference and/or excessive network traffic, the link quality of the node may degrade from the quality level 316 by an amount 318 to the quality level 320, which is in the lower link quality group 308. If further link quality degradation 322 occurs, then the node may be reduced to an even lower link quality level 324 at the bottom of the ranking of group 308.

An example path 326 shows reevaluation of a node in an example where link quality is improved. Note that reevaluation of link quality of a node may result in creation or rendering of a new version of the parent list 302. A node may have very poor link quality and may be rated at quality level 328 below other nodes in the lower link quality group 308. The quality level 328 indicates that the link would not be a candidate to be a parent of a network node having and/or using the parent list 302. However, the node may experience improving RF conditions, fewer packet collisions, less radio interference, etc. Responsive to these improvements, the link quality may increase by an amount 330 to locate the node at a new quality level 332, in the medium link quality group 306. Responsive to further improved conditions, the link quality of the node may improve from the quality level 332 by an amount 334 to the quality level 336, which is in the upper link quality group 304. If further link quality improvement 338 occurs, then the node may be elevated to an even higher link quality level 340 in the upper link quality group 304.

Accordingly, the example paths 310, 326 show how one-hop nodes that are potential parents of a node having and/or using the parent list 302 (e.g., as part of the rank and routing techniques 130, seen in FIGS. 1 and 2) can experience improved and worsened link quality, based on many issues including changing RF interference, changing packet transfer rates within the network, delays resulting from nodes entering and/or leaving the networks. In some example systems, a drop such as drop 314 (or greater) may result (e.g., because a threshold was exceeded) in the node selecting a new parent node from the parent list 302.

In some instances, selection of a new parent node by the node may result in the need to "poison" the children of the node, which breaks the parent/child relationship with the affected child nodes. Accordingly, such child nodes will have to look for new parent nodes. The child nodes may also have to poison their children, thereby creating a need to reform significant parts of the network with new parent/child relationships to relay data upstream and downstream.

Example Methods

In some examples of the techniques discusses herein, the methods of operation may be performed by one or more application specific integrated circuits (ASIC) or may be performed by the general-purpose processor 200 utilizing software defined in computer readable media. In the examples and techniques discussed herein, the memory 202 may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 4:
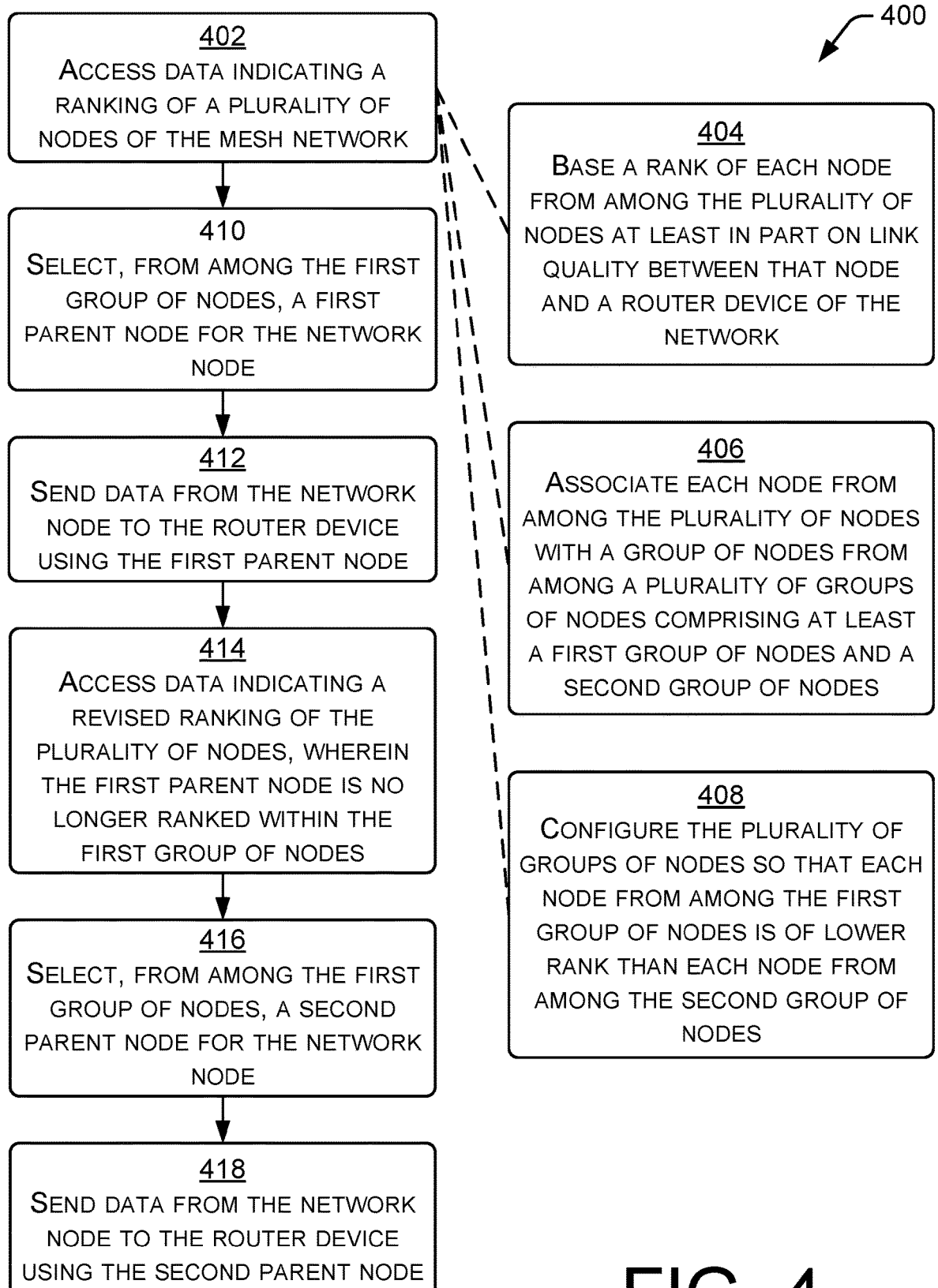
FIG. 4 is a flow diagram showing example method(s) for a network device to use rank and routing techniques to send and/or receive data in a mesh network environment.

FIG. 4 shows example method(s) for a node or other network device to use rank and routing techniques to send and/or receive data in a mesh network environment. In an example, a node assesses and ranks its one-hop upstream neighbors by link quality (e.g., a summation or other function or operation of link quality values over some pathway in the network). Three groups of potential parent nodes are formed based at least in part on, or consistent or proportional with, link quality. The node selects a parent having preferred link quality from among the nodes in the highest link-quality group. The node continues to relay data to and/or from the selected parent until a revised ranking of one-hop neighbor nodes of the node rates the parent node below a defined location in a group other than the preferred group (based at least in part on link quality) of nodes. The node may then select a different node from among the preferred group of nodes. The node may poison its children nodes (if any) requiring them to find a new parent node. Similarly, the node may require a new parent (even if its current parent is in the preferred link-quality group) if it is poisoned by its parent node.

At block 402, data is accessed or created indicating a ranking of a plurality of nodes of the mesh network. The ranking may be of those nodes from among the nodes in the network that are one-hop neighbors of a particular node and/or that are possible parent nodes of the particular node.

The ranking of the plurality of nodes and/or a parent list may be equal to, proportional to, and/or a function of, a link quality or routing metric. The ranking may be based on any desired link quality metric, such as expected transmission count (ETX) and/or estimated transmission time (ETT). The link quality metric may be a summation of one-hop link quality values from the particular node to a router or root node or another device. In examples, the link quality of each node in the ranking may be measured or estimated by an ETX of each node on the parent list to the router device, or an ETT of each node on the parent list to the router device. The data may be limited to one-hop upstream neighbors of a network node at issue. In the example of block 404, the ranking may be based at least in part on a link quality (or a summation of one-hop link quality values) of communications between each respective node and a router or other device of the network. In the example of block 406, each node from among the plurality of nodes is associated with a group of nodes from among a plurality of groups of nodes. In the example, the plurality of groups of nodes may include at least a first group of nodes and a second group of nodes. In another example, the plurality of groups of nodes may also include a third group (or even additional groups) of nodes. In the example of block 408, the plurality of groups of nodes are configured so that each node from among the first group of nodes is of lower rank than each node from among the second group of nodes. Thus, when the groups are configured each node is of lower rank than all nodes in groups with worse link quality. However, as network conditions change, the link quality of some nodes may improve or worsen, and they will move between the groups of nodes according to their link quality.

In a specific example of accessing data indicating the ranking, the network node may access or generate data similar to that seen in FIG. 3. The data may include a parent list (i.e., a list of possible one-hop parents). The data may include a listing of the first group of nodes ranked according to ETX and/or ETT; a listing of the second group of nodes ranked according to ETX and/or ETT; and a listing of a third group of nodes ranked according to ETX and/or ETT. The data may be generated by the network node, or may be received from other nodes (e.g., one-hop upstream neighbor nodes), the router, or an upstream server or central office. In an example, each one-hop upstream neighbor of the network node may send link quality information (e.g., ETX and/or ETT) to the network node, thereby allowing the network node to assemble the parent list (e.g., parent list 302, seen in FIG. 3). Thus, the network node may access data that may be based at least in part on data received at the network node from one-hop neighbors of the network node, or other location.

At block 410, a node is selected from among the ranked plurality of nodes to act as a first parent of the network node. In examples, a node may be selected from among the first group of nodes that: has a smallest expected transmission count (ETX); has a shortest estimated transmission time (ETT); requires (or is expected to require) re-transmissions by the fewest relay nodes; and/or by any known metric. In examples, the node is selected from among nodes on a parent list, such as the parent list 302 of FIG. 3.

At block 412, data from the network node is sent to and/or from the router device using the first parent node. Thus, the network node uses the parent node to relay data, commands, etc. in the upstream and/or downstream directions. In an example, data is sent from the network node (e.g., to the router device) using the first parent node while the first parent node: remains ranked within a highest link quality group; remains ranked within an upper half of the ranking of the plurality of nodes; remains ranked within a top half of the ranking of a secondary link quality group; and/or remains above a threshold set according to one or more link quality metrics. In a further example, data is sent from the network node to the root node using the first parent node while the first parent node remains ranked (e.g., based on link quality) above a threshold value within the ranking of the plurality of nodes. The ranking and threshold may be based on a summation of link quality of each hop from the network node to the root device, router device, or network device.

At block 414, data is accessed, received, generated, etc. by the network node indicating a revised ranking of the plurality of nodes. The plurality of nodes may include only one-hop upstream neighbors of the node accessing the information. In an example, the first parent node may no longer be ranked within the first group of nodes. In an example, the first parent node may have experienced link quality degradation and may have moved from a group of nodes having the "high" link quality to a group of nodes having "medium" or "poor" link quality. In a further example, the first parent node may have experienced link quality degradation and may have moved below a threshold link quality value.

At block 416, the network node (or remote network managing device, e.g., the router device 102 or central office 106) may select from among the first group of nodes (having highest link quality), a second parent node for the network node. Accordingly, the selection replaces the first parent node used by the network node with a second parent node. In examples, the node is selected from among nodes on a parent list, such as the parent list 302 of FIG. 3.

At block 418, data is sent to, or sent from, the network node using the second parent node. In some examples, data is sent to, or received from, the router and/or central office with the assistance of the second parent node.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method to reconfigure a network node in a network, comprising:
   accessing data indicating a ranking of a plurality of nodes of the network, wherein a rank of each node from among the plurality of nodes is based at least in part on a summation of link quality of a path between that node and a root node of the network and is equal to, or proportional to, the summation of the link quality of the path, wherein each node from among the plurality of nodes is associated with a group of nodes from among a plurality of groups of nodes comprising at least a first group of nodes and a second group of nodes, and wherein at a time of configuration of the plurality of groups of nodes, each node from among the first group of nodes is of higher link quality than each node from among the second group of nodes;
   configuring a parent list using one-hop neighbors of the network node from the ranking of the plurality of nodes;

selecting, from among nodes included in the first group of nodes and the parent list, a first parent node for the network node;

sending data from the network node to the root node using the first parent node;

accessing data indicating a revised ranking of the plurality of nodes, wherein the first parent node is no longer ranked within the first group of nodes;

selecting, from among nodes included in the first group of nodes and the parent list, a second parent node for the network node; and sending data from the network node to the root node using the second parent node.

2. The method of claim 1, wherein the rank of each node is based on factors comprising at least one of:

an estimated transmission number (ETX) of each node on the parent list to the root node; and an estimated transmission time (ETT) of each node on the parent list to the root node.

3. The method of claim 1, wherein accessing data indicating the ranking of the plurality of nodes comprises:

accessing a listing of the first group of nodes ranked according to estimated transmission time;

accessing a listing of the second group of nodes ranked according to estimated transmission time; and accessing a listing of a third group of nodes ranked according to estimated transmission time.

4. The method of claim 1, wherein selecting, from among the first group of nodes, the first parent node comprises:

selecting a node from among the first group of nodes that has a fastest estimated transmission time.

5. The method of claim 1, wherein sending data from the network node to the root node using the first parent node comprises:

sending data from the network node to the root node using the first parent node while the first parent node remains ranked above a threshold value within the ranking of the plurality of nodes.

6. The method of claim 1, wherein sending data from the network node to the root node using the first parent node comprises:

sending data from the network node to the root node using the first parent node while the first parent node remains ranked within the first group of nodes or within an upper half, based on rank, of the second group of nodes.

7. The method of claim 1, wherein accessing data indicating the revised ranking of the plurality of nodes, comprises:

accessing data based at least in part on data received at the network node from one-hop neighbors of the network node.

8. The method of claim 1, additionally comprising:

receiving data from a one-hop node of the network node indicating at least one of an estimated transmission number (ETX) or an estimated transmission time (ETT) of the one-hop node; and using the received data as at least part of the revised ranking of the plurality of nodes.

9. A network node, comprising:

a radio to transmit messages to and from a parent node;

a processor to control the radio; and a memory device comprising instructions defined thereon, the instructions configured to direct the processor to perform acts comprising:

accessing data indicating a ranking of a plurality of nodes, wherein each node from among the plurality of nodes is associated with a group of nodes from among at least a first group of nodes, a second group of nodes, and a third group of nodes, wherein each node from among the first group of nodes is of higher link quality than each node from among the second group of nodes, and wherein each node from among the second group of nodes is of higher link quality than each node from among the third group of nodes;

configuring a parent list using one-hop neighbors of the network node from the ranking of the plurality of nodes;

selecting, from among nodes included in the first group of nodes and the parent list, a first parent node for the network node;

sending data from the network node to a root node using the first parent node;

accessing data indicating a revised ranking of the plurality of nodes, wherein the first parent node is no longer ranked within the first group of nodes;

selecting, from among nodes included in the first group of nodes and the parent list, a second parent node for the network node; and sending data from the network node to the root node using the second parent node.

10. The network node as recited in claim 9, wherein the acts performed additionally comprise:

associating nodes with each of the first group of nodes, the second group of nodes and the third group of nodes according to a global estimated transmission time (ETT) of each of the plurality of nodes.

11. The network node as recited in claim 9, wherein the acts performed additionally comprise:

configuring a parent list that is based on rank;

wherein the rank is proportional to a link quality metric.

12. The network node as recited in claim 9, wherein the acts performed additionally comprise:

configuring a parent list that is based on rank;

wherein the rank is equal to a link quality metric.

13. The network node as recited in claim 9, wherein the acts performed additionally comprise:

evaluating at least one of estimated transmission number (ETX) and estimated transmission time (ETT) to determine a rank of each of the plurality of nodes; and configuring a parent list based on the evaluating.

14. The network node as recited in claim 9, wherein selecting the second parent node is performed only if the first parent node has a rank that indicates link quality worse than link quality of a threshold value.

15. The network node of claim 9, wherein sending data from the network node to the root node using the first parent node comprises:

sending data from the network node to the root node using the first parent node while the first parent node remains ranked within the first group of nodes or within an upper half, based on rank, of the second group of nodes.

16. A method to reconfigure a mesh network, comprising:

accessing data ranking a plurality of nodes, wherein a rank of a network node from among the plurality of nodes is based at least in part on a summation of link quality values between the network node and a root node and is equal to, or proportional to, the summation;

configuring a parent list using one-hop neighbors of the network node from the ranking of the plurality of nodes;

associating each node from among the plurality of nodes with one group of nodes from among groups of nodes comprising a first group of nodes, a second group of nodes, and a third group of nodes, wherein the associating is based on link quality, wherein the associating comprises part of the parent list of the network node within the mesh network;

storing the parent list at the network node;

selecting, based at least in part on the parent list, a first parent node for use by the network node, wherein the first parent node is selected from the first group of nodes;

utilizing the first parent node to relay data from the network node over the mesh network;

accessing the parent list, wherein the parent list indicates a revised ranking of the plurality of nodes, wherein the first parent node is no longer within the first group of nodes;

selecting, from among the first group of nodes, and based at least in part on the parent list, a second parent node for the network node; and sending data from the network node to the root node using the second parent node.

17. The method of claim 16, wherein accessing data of the ranking of the plurality of nodes comprises:

accessing an estimated transmission number (ETX) for each node on the parent list;

wherein the ranking of the plurality of nodes is based on the ETX for each node on the parent list.

18. The method of claim 16, wherein accessing data of the ranking of the plurality of nodes comprises:

accessing an estimated transmission time (ETT) for each node on the parent list;

wherein the ranking of the plurality of nodes is based on the ETT for each node on the parent list.

19. The method of claim 16, wherein the revised ranking of the plurality of nodes comprises updated link quality of each respective node in the parent list.

20. The method of claim 16, wherein according to the revised ranking of the plurality of nodes, the first parent node has a rank higher than a median rank of nodes within the plurality of nodes.

* * * * *